United States Patent
Wang et al.

(10) Patent No.: US 9,237,064 B2
(45) Date of Patent: Jan. 12, 2016

(54) COMMUNICATION METHOD AND APPARATUS OF NETWORK MANAGEMENT SYSTEM

(75) Inventors: Zhao Wang, Beijing (CN); Bernhard Deck, Weilheim (DE); Jukka Kinnunen, Laihia (FI)

(73) Assignee: ABB RESEARCH LTD., Zurich (CH)

( * ) Notice: Subject to any disclaimer, the term of this patent is extended or adjusted under 35 U.S.C. 154(b) by 295 days.

(21) Appl. No.: 13/814,567

(22) PCT Filed: Aug. 12, 2010

(86) PCT No.: PCT/CN2010/075931
§ 371 (c)(1),
(2), (4) Date: Feb. 6, 2013

(87) PCT Pub. No.: WO2012/019351
PCT Pub. Date: Feb. 16, 2012

(65) Prior Publication Data
US 2013/0132555 A1    May 23, 2013

(51) Int. Cl.
*H04L 12/24* (2006.01)
*H04B 3/54* (2006.01)
*H02H 7/26* (2006.01)

(52) U.S. Cl.
CPC ............. *H04L 41/042* (2013.01); *H02H 7/261* (2013.01); *H04B 3/544* (2013.01); *H04B 2203/5425* (2013.01); *H04B 2203/5458* (2013.01)

(58) Field of Classification Search
CPC ...... H04L 41/042; H02H 7/261; H04B 3/544; H04B 2203/5425; H04B 2203/5458
See application file for complete search history.

(56) References Cited

U.S. PATENT DOCUMENTS

| | | | | |
|---|---|---|---|---|
| 6,055,144 | A * | 4/2000 | Reid | 361/64 |
| 7,756,027 | B1 * | 7/2010 | Reddy et al. | 370/230 |
| 2002/0057543 | A1 * | 5/2002 | Carteau et al. | 361/64 |
| 2011/0172838 | A1 * | 7/2011 | Pai et al. | 700/292 |

FOREIGN PATENT DOCUMENTS

| WO | WO0048288 A1 | 8/2000 | |
|---|---|---|---|
| WO | WO 2009/016038 * | 7/2008 | H02J 3/04 |
| WO | WO2009016038 A2 | 2/2009 | |

OTHER PUBLICATIONS

ISA/CN International Search Report re PCT Application No. PCT/CN2010/075931, Dated May 5, 2011.
IPEA/CN International Preliminary Report on Patentability re PCT Application No. PCT/CN2010/075931, Dated Nov. 2, 2012.

* cited by examiner

*Primary Examiner* — Nicholas Taylor
*Assistant Examiner* — Tania Pena-Santana
(74) *Attorney, Agent, or Firm* — Robert A. Jefferis; Driggs, Hogg, Daugherty & Del Zoppo Co., LPA

(57) ABSTRACT

The invention provides a communication system for a power distribution network, which comprises at least two distribution domains, each of the domains includes one management device and at least one electrical device. The management device is configured as connected with the electrical devices within its domain, and is further configured as capable of collect information from the electrical devices. The system also comprises a communication link, which is arranged for the management devices of different domains, and the management devices are configured as capable of directly exchanging information through the link.

14 Claims, 3 Drawing Sheets

COMMUNICATION METHOD AND APPARATUS OF NETWORK MANAGEMENT SYSTEM

RELATED APPLICATION

This application is a national filing of PCT application Serial No. PCT/CN2010/075931, filed Aug. 12, 2010.

TECHNICAL FIELD

The invention relates to a communication system and a communication apparatus adopted in a network management system. In particular, the invention relates to a communication method, apparatus and system for exchanging network management data among different domains of a power distribution system.

BACKGROUND ART

A power distribution system is an interface between a power transmission network and the electricity end-customers. Typically, the power distribution system comprises a number of primary equipment and secondary equipment. In most situations, the primary and secondary devices are connected by cables, and a few primary devices comprise a communication links to the secondary devices. The primary equipment mainly comprises the equipment subject to high voltages current, e.g., transformers, circuit breakers and capacitor banks. The secondary equipment comprises the equipment subject to low voltage current and mainly acts as a controller for interacting with the primary equipment, such as Intelligent Electronic Devices (IED) and the like.

An Intelligent Electronic Device (IED) is a microprocessor-based controller of power system equipment. The IED can receive data from sensors and power equipment and issue control commands, such as tripping circuit breakers if any voltage, current, or frequency anomalies was detected, or raising/lowering voltage levels in order to maintain the desired level. A typical IED can contain line protection functions, control functions controlling separate devices, an auto-reclose function, self monitoring function, and communication functions etc. In a distribution network, the IEDs are used to directly control connected primary devices.

An IED is the controller to those directly connected primary devices, and a regional controller for all primary devices and secondary devices within the region is referred to as a master device or master. All IEDs within the region can send the information collected from primary devices to the master device. The master device controls the overall operation process of all power devices in its region.

In a power distribution network level, a network control center can be used to control and supervise the operation status of all regions. Each region includes a master device, and all master devices have a communication link to the network control center. The master devices exchange their data with network control center through the communication link. The controllers of the power network are with different hierarchical ranks. For the time being, the main communication approach of power system applications is a "vertical" one between different application hierarchies, e.g. communication between substation automation systems (e.g., master devices) and IEDs, communication between network control center and substation automation system, communication between distribution automation system and feeder terminal units. Many standards or protocols can be used in the communication mentioned above, e.g. IEC61850, DNP 3.0, IEC60870-5-104, etc.

Along with the development of power system automation, especially for SmartGrid and distributed intelligence, distributed application becomes a requirement of the trend. For example, the distribution automation functions can be distributed into sub-level to get a higher reliability and flexibility. Moreover, the future SmartGird application will have distributed applications. These distributed applications need distributed communication among them, e.g. a "horizontal" communication link among distributed master devices of the same control hierarchy to exchange data/information. Currently, there is no standard or protocol for such a horizontal communication between master devices, and there is also no common communication platform which enables data/information exchanging among these distributed applications.

In order to facilitate the overall management of a power distribution system, the whole distribution network is divided into several distribution domains. Each distribution domain is assigned with several pieces of primary equipment and defined by electrically unambiguously connected primary equipment. Each domain may include a network management controller, which is referred to as "master device". The master device collects operating status and other operation-related parameters from all primary and secondary devices within its domain, and reports the collected domain operating status to the control center of the whole distribution network. The master device controls all power equipment within its domain by directly issuing instructions. And the distribution network control center control all power equipment with in the network by issuing in-direct instructions via master devices of each domain.

In a conventional distribution network, various master devices in different domains are unable to communicate with each other directly. In order to exchange information, a source master device shall send information to the network control center, and the network control center then forwards the information to a target master device of another domain. The conventional communication approach is obviously complicated and inefficient. In such a communication system, the communication of all subordinate devices will be interrupted when the control center is under maintenance or mal-functioned. This will cause significant trouble for the devices within the distribution network.

In order to improve the inefficiency of current vertical communication between different domains, it is one object of the invention to propose a "horizontal" inter-master devices communication method and platform. The proposed approach makes it possible to conduct direct communication between master devices at different domains.

BRIEF SUMMARY OF THE INVENTION

It is one object of the invention to propose a common communication platform for distributed master devices and the applications implemented thereon. This objection is achieved by suitable network dividing, building common master communication platform and configuring devices in the system. An effective method to divide a power distribution network into several different logical domains is a pre-requisite condition. After building the inter-master communication platform, the master devices in a certain area can implement an easy configuration through the horizontal communication.

The proposed communication platform supports both data exchanging among master devices and among their applications. The communication platform supports most existing main-stream protocols, e.g. IEC61850, DNP 3.0, IEC60870-5-104, OPC, etc. The communication platform can be extended by adding new protocols into protocol stack. The communication system is independent from the applications implemented thereon.

According to the invention, the proposed method of dividing whole network into several logical domains considers the function allocation and the physical communication network, e.g. the fiber optic network which connect the master to FTUs. This network dividing method enables the master device find its neighbour master devices very quickly.

According to the invention, the whole primary network is divided into several logical domains from the tie-switch points. For each tie-switch, one master has real tie-switch; another master has virtual tie-switch which represents the real one. Each domain is controlled by one master, which gets information from the domain or controls the domain through IEDs. One master could access other domains through other masters.

According to the invention, the proposed method for easy configuration of electrical devices within the domain supports automatic master device configuration.

According to one preferred embodiment of the invention, it is provided a communication system for a power distribution network, which comprises at least two distribution domains, each of the domains includes one management device and at least one electrical device. The management device is configured as connected with the electrical devices within its domain, and is further configured as capable of collect information from the electrical devices. The system also comprises a communication link, which is arranged for the management devices of different domains, and the management devices are configured as capable of directly exchanging information through the link.

According to another preferred embodiment of the invention, the system further comprises a control center for overall controlling all management devices and electrical devices in the network, and a first management device communicates with the control center, electrical devices and a second management device through a server-client based communication technology.

According to another preferred embodiment of the invention, the system further comprises a control center for overall controlling all management devices and electrical devices in the network and a first management device communicates with the control center and electrical devices through a server-client based communication technology. Wherein, the first management device communicates with a second management device transparently through a protocol interface.

According to another preferred embodiment of the invention, wherein the two distribution domains are divided from a point of switch device shared by both of the domains, wherein, one of the domains uses the shared switch as a physical switching device; and the other domain uses the shared switch as a virtual switching device.

According to another preferred embodiment of the invention, wherein, an OPC server module and an OPC client module is embedded in the management devices. The OPC server module is capable of receiving data from the OPC client module, and the OPC client module is capable of sending data to the OPC server module. The management device accesses the electrical devices through the OPC server module, and it can be accessed by the control center through the OPC client module.

According to another preferred embodiment of the invention, wherein, the first and second management devices compile operating status collected from the electrical devices within their respective domain as a configuration file, and store the configuration file in an internal database. The first and second management devices deploy the configuration file to re-configure the operating status of all electrical devices. And the first and second management devices are capable of exchanging the configuration file.

According to another preferred embodiment of the invention, it provides a management apparatus for a power distribution network, which comprises a first communication port for communicating with devices of lower hierarchy, a second communication port for communicating with devices of higher hierarchy, a third communication port for communicating with devices of same hierarchy, a database connected with the first, second and third communication ports. Wherein, the third communication port is configured to provide devices of the same hierarchy with direct access to the database.

According to another preferred embodiment of the invention, the apparatus further comprises a protocol module for converting data transmitted through the communication ports as a format in line with a pre-determined protocol, and a server module as well as a client module for exchanging data between the database and communication ports in a server-client mode.

According to another preferred embodiment of the invention, it provides a communication method for a power distribution network, which comprises dividing the network into a plurality of domains from the point of tie-switches, establishing a direct link between every two domains, and conducting communication between controllers of the two domains via the direct link.

According to another preferred embodiment of the invention, the communication method further comprises generating a configuration description file by the controllers of their respective domain, and transmitting the configuration file between the controllers through the direct links.

BRIEF DESCRIPTION OF THE DRAWINGS

Further embodiments, advantages and applications of the invention are disclosed in the claims as well as in the following description, which make reference to the accompanied FIGS. 1-4, wherein:

PREFERRED EMBODIMENTS OF THE INVENTION

The proposed communication approach is designed for "horizontal" information exchange among distributed master devices of network management systems e.g., distributed feeder automation, smart grid and the like. Specifically, a properly constructed master devices communication approach involves the following aspects: first, how to suitably divide a distribution network into several master-device-containing domains; second, how to effectively establish a communication platform for information exchanging among master devices and their applications; third, how to configure the network and domains with minimum efforts. The above aspects constitute a complete solution for maintaining an effective and operation of network management system. Each of above aspects will be explained in the following paragraphs.

Figure 1:
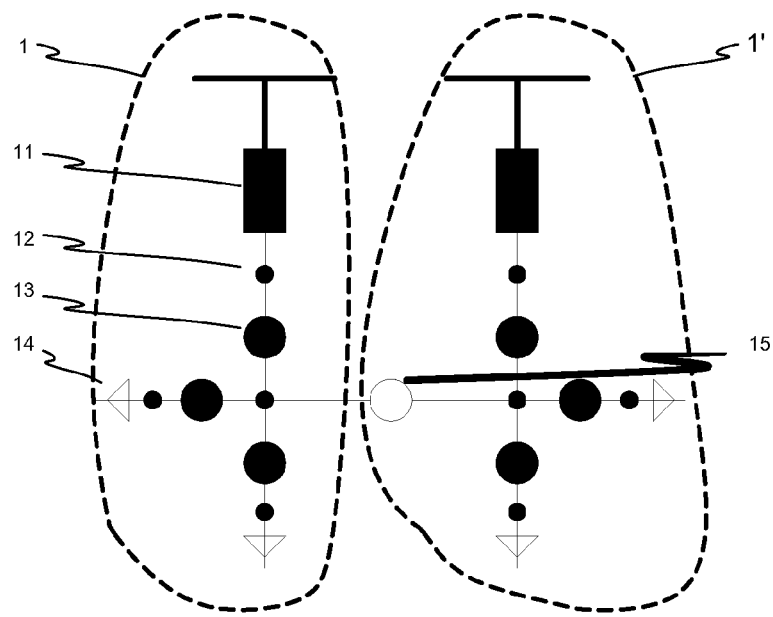
FIG. 1 is a schematic view of the power distribution devices at two adjacent domains.

As shown in FIG. 1, in a power distribution network with multiple power sources, each power source only supplies a part of the whole network. In a normal operating scenario, different parts powered by respective sources are physically separated from each other via a tie-switch. Basically, a tie switch is a device operable to selectively allow power flow from different power buses to one end user. In normal status, the tie-switches are disposed in an "open" status to ensure the power separation. In FIG. 1, the whole network of power transmission devices can be divided into several geographical or logical domains (1 and 1'). The domains are divided from the geographical point where the tie-switch (15) locates.

The tie switch (15) is a physical switching device shared by two domains (1 and 1'). Specifically, in one domain, the tie-switch acts as a physical switching device and acts as a virtual switching device in another domain. In FIG. 1, the tie-switch (15) acts as a physical switching device in domain (1') and acts as virtual device in domain (1). In each domain, several primary devices as well as load are included e.g. busbar, transformer, circuit breaker (11), switch (13), feeder line (14) and load (12).

All primary devices in each domain are controlled by one master device through several IEDs connected therewith. The IED may be attached on the primary devices or arranged in a separate way. As long as the IED has a cable or link to the primary device, any suitable arrangement is applicable to the embodiments of present invention.

A communication link is established between the IEDs and master device. As described, the communication links within one domain operates in a vertical way. Specifically, the IEDs receive instructions from the master device, and they send information to master device according to the received instruction. In one embodiment, for the cable between IED and primary devices, it is mainly used to carry high or low voltages or current signals. The IED may find out the status of primary device immediately by detecting the level on the cable. And the primary device will perform requested actions based on the voltage level issued by IED.

Figure 2:
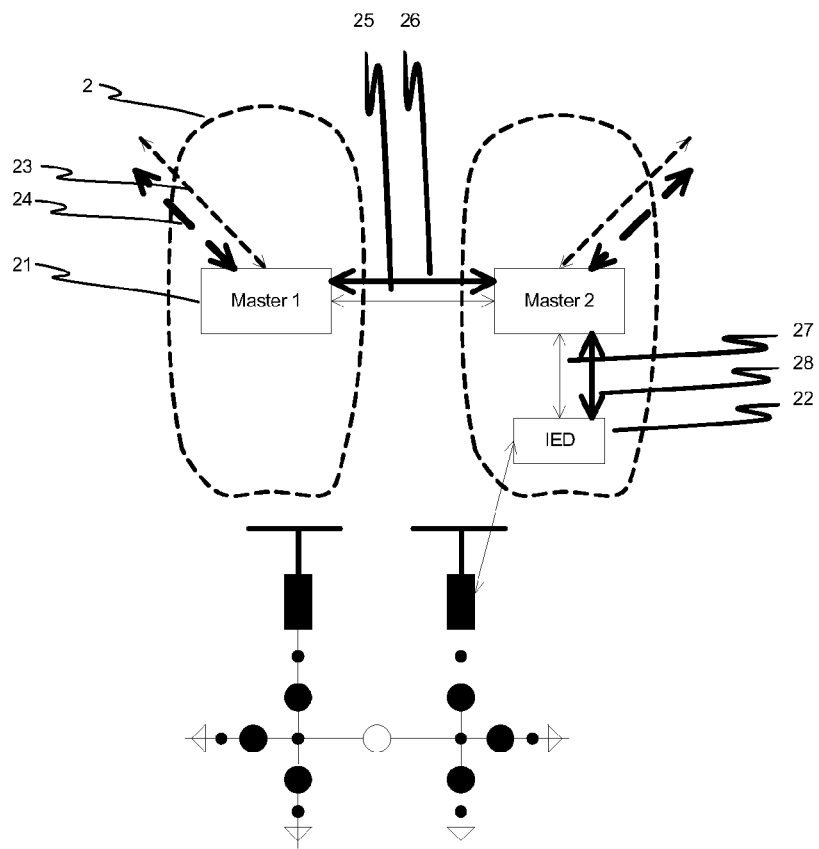
FIG. 2 is a schematic view of communication between two master devices.

In FIG. 2, IED (22) controls all directly connected primary devices (11, 12, 13, or 14) through voltage or current level on the cable. The current primary devices have no intelligence, and receive secondary device's intelligent supervisory, protection and control. In an embodiment, the IED (22) collects operating information from load (12) and determines whether any operation of switch (13) is required. In the case of an overload situation is detected by IED, it sends a, for example, high level signal on the connecting cable to switch (13) to protect power line . . . .

FIG. 2 also illustrates data flow among IED (22) and its master device (21). According to the figure, a circuit breaker (11) contacts with the master device (21) in its domain (2) indirectly through IED (22). The instruction flow and data flow between master device and IED may be conducted through separate channels (27 and 28). Alternatively, the instruction flow and data flow can be transmitted through the same channel.

In FIG. 2, a master device controls all primary and secondary devices within its domain through vertical communication. And a master device (Master 1) communicates with other master devices (e.g., Master 2) through horizontal communication (25, 26). The term horizontal indicates the sender and receiver of communication are peer devices of the same controlling hierarchy. In FIG. 2, the two master devices (Master 1 and Master 2) locate in two neighbouring domains. Master 1 sends a request to Master 2 for obtaining information when it needs to know operating status of its neighbouring domain. The instruction and data can be exchanged between the master devices through two separate channels (25, 26). Alternatively, both instruction and data can be exchanged through a single channel.

In one embodiment, in order to obtain operating information within its own domain, one master device sends request of information to those directly connected IEDs. In contrast, the master device sends request to the peer master device instead of IEDs in a target domain to obtain operating information of the neighbouring domains. The master device being requested then issues an information-collecting instruction to its IEDs, and forwards collected information to the requesting master device. That is to say, a master device has an indirect access to the electrical devices of neighbouring domains through the horizontal communication.

In another embodiment, a master device does not need to actively inquire the status of electrical devices. Since the IED knows the status of every primary device connected through cable, and it will automatically upload the status information to its master device. Therefore, the master device can know all operating status without any extra-effort. It is a very efficient approach because the information is uploaded automatically without any time delay from master device.

In one embodiment, a master device communicates with a control center of the distribution network through vertical communication. Similarly, master devices (Master 1, Master 2, etc.) collect information from IEDs and other devices in its respective domain, and send the collected information to the network control center (not shown in FIG. 2). The control center receives operating information from various domains and works out an operating plan for each domain. The operating plans are then sent back to master device of every domain. The master device may translate the received operating plan and distribute to its IEDs.

In another embodiment, the master devices may also cooperate with other masters to decide how to control electrical devices and deal with faults without involving control centre. However, the master device may send all exchanged information to control centre for its future reference. For example, when a fault is occurred at domain 1, the master device (Master 1) may trip circuit breaker (11), and ask its neighbouring master device (Master 2) to switch-on the tie-switch (15). In this situation, the master devices decide on its own to provide electricity to domain 1 from domain 1'. The decision and status of each electrical device will be sent to and recorded at control center.

Figure 3:
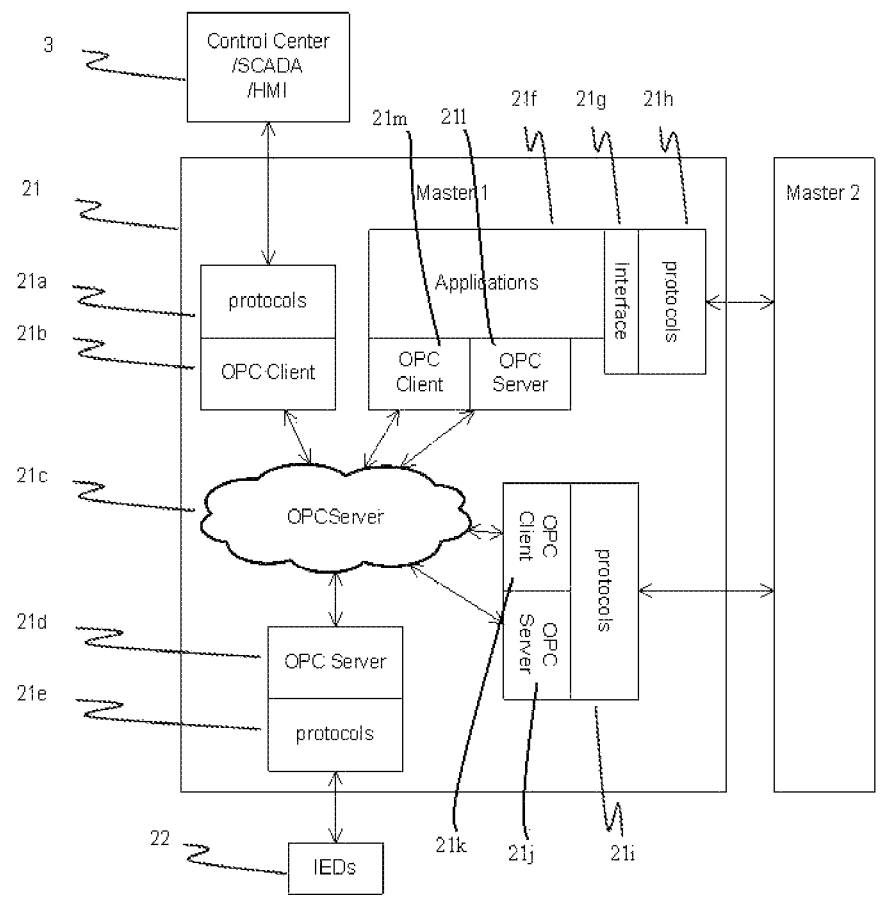
FIG. 3 is a schematic view structure of the master device.

FIG. 3 shows an example structure of the master device. FIG. 3 includes two master devices (Master 1 and Master 2), a control center (3) and several IEDs (22). In an actual network, the control center can be implemented as a SCADA (Supervisory Control and Data Acquisition) system or a HMI (Human Machine Interface).

According to FIG. 3, the master device (Master 1) includes a communication client module collection (21b), a central communication server module collection (21c), a protocol module collection (21a, 21h, 21i, and 21e), an interface module (21g) and various applications executed by the master device (21f). The server collection and client collection carry out the responsibility of communication between different modules within the master device or communication between internal module and external devices. In one master, the central server collection (21c) is a virtual server and represents all the real server modules (21l, 21j, 21d) within the master. Each of the real server modules may support one specific protocol. The server module stores data received from various IEDs and applications.

In a preferred embodiment of the invention, the server collection and client collection are implemented as an OPC (OLE for process control) server and an OPC client module. OPC is an industry standard which defines methods for exchanging real time automation data between PC-based clients using Microsoft operating systems. The application of the OPC standard interface makes the interoperability between automation/control applications, field systems/devices and business/office applications possible. It should be noted that other suitable technology can be used for the server and client module of the master device.

As show in the figure, several real OPC server modules (21*d*, 21*j* and 21*l*) are included in the master device (Master 1). The virtual OPC server collection (21*c*) may act as a database and restores all data obtained from local IEDs, local applications, remote IEDs and remote applications. All information shall be eventually sent to the server and stored therein. Moreover, all internal modules and external devices shall have access the central server module (21*c*) for obtaining information.

A protocol module (21*a*, 21*e*, 21*i* and 21*h*) is arranged between two devices where communication is required. In order to use different protocols to communicate with various devices (IED 22, Master 2 or control center 3), the protocol module packs information according to a designated communication protocol. For example, a master device (Master 1) communicates with a subordinate IED (22) with a predetermined protocol, e.g., IEC61850. The protocol module receives information from the OPC server module, converts the information into packages in line with IEC61850, and sends the packages to the IED (22). By configuring the protocol module, various mainstream communication standards can be selected and used between devices, such as IEC61850, DNP 3.0, IEC60870-5-104, OPC, etc. The master device may select a suitable protocol from the protocol sets and communicate with different target devices according to actual requirement. The communication procedure would be very flexible and scalable through such a protocol module.

The different protocols used by different applications and devices were converted by the OPC server/client into a universal one. For example, the OPC server (21*d*) use IED protocols to communicate with IEDs (22), and the OPC server (21*l*) may use suitable protocols to communicate with corresponding applications (22*f*).

For internal communication between central server module (21*c*) and various applications (21*f*) executed by the master device, no protocol module is needed. An OPC client module (21*m*) and an OPC server module (21*l*) are arranged for the applications (21*f*). In the case of any data is required by the applications, the OPC client module (21*m*) or OPC server module (21*l*) shall be used to access the database of other OPC server modules. The application acts as a client when the client module (21*m*) is used for accessing data from central server module, and the application acts as a server when the server module (21*l*) is used for exposing data to the central server module.

Contrary to the applications (21*f*), only a client module (21*b*) is arranged for the communication between control center and master device. That is, in the communication with master device, the control center always acts as a client for accessing data. For the communication with IEDs, only a server module (21*d*) is arranged. That is, in the communication with the master device, the IEDs always act as a server for providing data.

Both communications between the IED (22), master device and control center are one-way only. That is, the control center may access the master device, but the master device does not have access to the data of control center. Similarly, the master device has access to IEDs, but IED does not have access to the data of master device.

In FIG. 3, the Master 1 may communicate with other master devices (Master 2) through two different ways. The two communication ways may be integrated in one master device or separately implemented by different master devices.

One possible way of communication between master devices is based on the OPC technology described above. In an OPC Server, the IEDs located within the master device's domain are recognized as "real" IED, and the IEDs located at other domains are recognized as "virtual" IEDs. More specifically, the applications implemented on each master device are also recognized as a "virtual" IED of the master device.

In FIG. 3, both vertical communication with real IEDs and horizontal communication with other master devices (as well as virtual IEDs) are supported by OPC collection. In one embodiment, the control center (3) may send a data request via OPC client module (21*b*) to central OPC server module (21*c*) when there is a need for communication with master device (Master 1). Once the OPC Client module (21*b*) has access to the central OPC Server module (21*c*), it also has access to the data stored therein. The central OPC server module (21*c*) sends the requested data to OPC client module (21*b*), and the client module (21*b*) forwards the data to control center (3) as a response of the data request. The data send through OPC client module (21*b*) has to be packed into a format in line with one of the implemented protocols.

In another embodiment, the master device may provide its data to the control center unsolicited through the vertical communication channel. That is, the control center is aware of any status of its master devices without any operation.

When a master device (Master 1) needs to communicate with its real IEDs (22), a procedure (an active inquiry or an unsolicited approach) similar to the one above is performed. The interface between the master device and real IEDs are OPC server (21*d*). One master device (master 1) can exchange information with its virtual IEDs through other master devices (Master 2). A client module (21*k*), a server module (21*j*) and a protocol module (21*i*) are arranged for communication between the master devices. That is, in the communication between master devices, the master device may act either as a server or a client.

In order to access virtual IEDs, Master 1 sends data request to its peer master device as a client. The receiving master device (Master 2) then forwards the request to the virtual IEDs of Master 1 (real IED of Master 2). The communication between Master 2 and its real IED is implemented similarly to the communication procedure described with regard to Master 1. Master 2 sends the requested data back to Master 1 as a server. When Master 2 wants to data from the real IED of Master 1, a similar procedure is conducted. In this situation, Master 2 acts as a client and Master 1 acts as a server. It can be seen that in an inter-master communication, the requesting party will act as client and the requested party will act as server. Therefore, the role of each master device is equivalent and both of them have access to the other.

In another embodiment, the communication between master devices can be unsolicited. That is, one master device automatically distributes the operating information of its electrical devices to those neighboring master devices, which will be more efficient.

A master device may communicate with IEDs or high level automation applications with different vertical communication protocols, e.g. IEC61850, DNP3.0, Modbus and so on. A master device may communicate with other master devices with different horizontal communication protocols, e.g. IEC61850, Web Services and so on.

In another approach, the communication between master devices is conducted through the applications. Such an application-based communication is referred to as a "master device transparent" communication.

In a master device (Master 1), one application (21f) manages its own data. Moreover, as disclosed above, the application can be regarded as a virtual IED of its master device. The application decides what data will be exchanged and how these data will be exchanged based on their specific requirement. An interface module (21g) is arranged between the application and protocol module (21h). The interface module is capable of translate the messages between application data's format and the formats supported by the protocol module. Moreover, the interface module manages the connection with applications and connections with protocols. The protocol module will exchange the data without involvement of the OPC collections of the master device. That is, the data exchange between an application and the devices in neighboring domains is transparent to the master device. One master device could exchange data with other master devices with virtual TED in different protocols through the interface module and protocol module. The communication platform will support extension of new protocols by simply adding the new protocols into the stack of interface module and protocol module.

Figure 4:
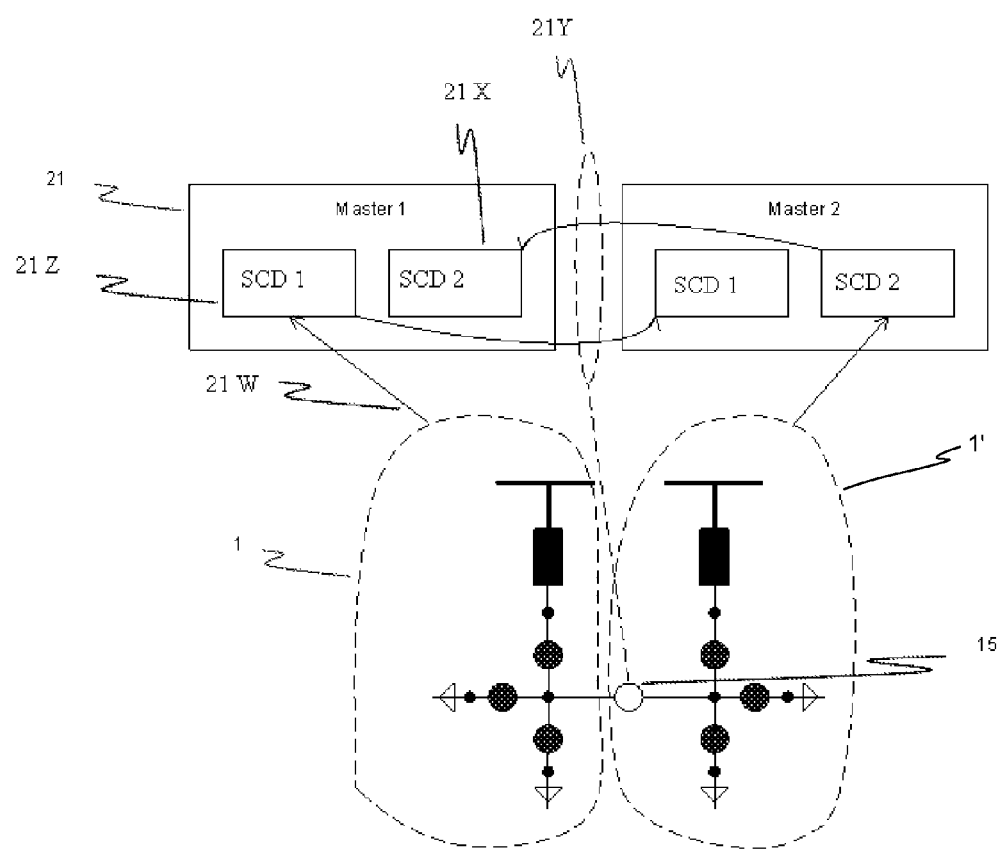
FIG. 4 schematically shows the configuration process.

Many tasks can be performed with ease through the inter-master communication. According to one aspect of the invention, the communication can be utilized to configure devices within a domain. FIG. 4 shows a schematic diagram of configuring master devices of neighbouring domains.

Each master device (Master 1 or Master 2) may automatically generate (21w) a configuration description file (SCD file) of all devices of its domain. The configuration description file may comprise the topology of its domain, the connection relationship of various devices, any static or dynamic operating parameters, such as operating current and voltage, open or close status of a circuit breaker, etc. The configuration description file may also comprise the amount of IEDs connected with the master device, the communication address of every IED and other master devices. According to one preferred embodiment of present invention, an IED can be described as a "class" in the configuration description file, and its functions, operating parameters and internal database structure are encapsulated in the class.

As described above, the whole power distribution network is divided at the point of tie-switch, One master device considers the tie switch as a real tie-switch, and the another master device considers the tie switch as a virtual tie-switch (representing the real one). Therefore, neighbouring master devices could be found by search all master devices having the same real/virtual tie-switch. One master device may get configuration of other master devices from its direct neighbouring master devices.

As shown in the embodiment of FIG. 4, two SCD files for Master 1 and Master 2 are generated and stored respectively. The SCD files for Master 1 and 2 (21x and 21z) are generated at Master 1 and 2 by collecting information from their directly connected IEDs (real IED). The applications generate their own configuration profiles.

One master device may obtain the configuration description files through the connected peer master devices to obtain the configuration of other domains. The requesting master device may identify a neighbouring master device by searching a master device share the same tie-switch with itself. After identifying the target master device, the requesting master device order the SCD file from the target master device. As shown in FIG. 4, upon request, Master 1 sends a copy of its SCD file to Master 2, and Master 2 sends a copy of its SCD file to Master 1. The communication approach used for exchanging files can be either OPC based communication or master-transparent communication.

In another scenario, a master device may request configuration information from more than one neighbouring master devices. The procedure of identifying neighbouring master device and obtaining its SCD file for multiple domains can be implemented in parallel or sequentially. After the procedure, the requesting master device will possess the configuration files of all its neighbouring domains.

By adopting this feature, it is easy for a master device configuring all its devices in a way identical to a neighbouring domain. The master device will first request the SCD file from the target master device and implement/apply the configuration strategy to its IEDs based on the requested SCD file. Since various SCD files may be stored in the master device, the configurations can be easily applied to the devices within the domain.

For those skilled in the art, various modifications can be conceived without departing from the scope of present invention. For example, various technologies other than OPC can be used to perform the vertical and horizontal communication. The invention intends to include all possible modifications within the proposed concept, and the scope of the invention should be defined by the accompanied claims instead of above detailed embodiments.

The invention claimed is:

1. A communication system for a power distribution network, comprising:
    at least two electrical power distribution domains, each of the at least two electrical power distribution domains includes one management device and at least one electrical device which operates to distribute power in one of the at least two electrical power distribution domains;
    wherein the at least two electrical power distribution domains are divided from a point of a tie-switch device shared by the at least two electrical power distribution domains which switches electrical power between the at least two electrical power distribution domains, one of which uses the shared tie-switch as a physical switching device, and the other of which uses said shared switch as a virtual switching device; and
    the management device is connected with the at least one electrical device within its domain and collects information from the at least one electrical device; and
    a communication link arranged for peer communications between the management devices of the at least two electrical power distribution domains;
    wherein the management devices directly exchange information through the communications link, and the exchanged information includes a configuration file compiled by each management device which includes a status of each of the at least one electrical device within its domain.

2. The communication system according to claim 1, further comprising,
    a control center for overall controlling all of the management devices and the electrical devices in the at least two power distribution domains of the power distribution network;
    wherein a first management device of the management devices communicates with the control center, the electrical devices and a second management device of the management devices through server-client based communications.

3. The communication system according to claim 1, further comprising,
a control center for overall controlling all of the management devices and the electrical devices in the at least two electrical power distribution domains of the power distribution network; wherein a first management device of the management devices communicates with the control center and the electrical devices through server-client based communication; and
the first management device communicates with a second management device of the management devices transparently through a protocol interface.

4. The communication system according to claim 2, wherein,
an OPC server module and an OPC client module are embedded in each of the management devices;
the OPC server module receives data from the OPC client module, and the OPC client module sends data to the OPC server module;
the management device accesses the electrical devices through the OPC server module; and
the management device is accessed by the control center through the OPC client module.

5. The communication system according to claim 1, wherein,
the first and second management devices compile operating status collected from the electrical devices within their respective domain as the configuration file;
the first and second management devices each store their respective configuration file;
the first and second management devices deploy the configuration file to re-configure the operating status of all electrical devices within their respective domains; and
the first and second management devices exchange the configuration files.

6. A communication method for a power distribution network, comprising:
dividing the power distribution network into a plurality of domains from a point of tie-switches, each of which is shared by two domains and switches power between the two domains, one of which uses a shared tie-switch as a physical switching device, and the other of which uses said shared switch as a virtual switching device;
establishing a direct peer communications link between every two domains with a separate controller for each domain, and each controller is connected to at least one electrical device which operates to distribute power in one of the two domains; and
conducting communication between the controllers of the two domains via the direct communications link with exchanged information that includes a configuration file compiled by each controller and the configuration file includes a status of each of the at least one electrical device within its domain.

7. The communication method according to claim 6, further comprises:
generating a configuration description file by the controllers of their respective domain; and
transmitting the configuration files between the controllers through the direct communications link.

8. The communication system according to claim 2, wherein,
an OPC server module and an OPC client module are embedded in each of the management devices;
the OPC server module receives data from the OPC client module, and the OPC client module sends data to the OPC server module;
the management device accesses the electrical devices through the OPC server module; and
the management device is accessed by the control center through the OPC client module.

9. The communication system according to claim 3, wherein,
an OPC server module and an OPC client module are embedded in each of the management devices;
the OPC server module receives data from the OPC client module, and the OPC client module sends data to the OPC server module;
the management device accesses the electrical devices through the OPC server module; and
the management device is accessed by the control center through the OPC client module.

10. The communication system according to claim 4, wherein a second OPC server module and a second OPC client module are embedded in each of the management devices and arranged for communication between management devices.

11. The communication system according to claim 10, wherein the second OPC server module and the second OPC client module exchange configuration files between neighboring domains.

12. The communication system according to claim 11, wherein the second OPC server module and the second OPC client module request one of the neighboring domain management devices to switch-on the tie-switch to provide electricity from the one of the neighboring domains based on the exchanged configuration file.

13. The communication system according to claim 12, wherein the management device communicates with the at least one electrical device through the OPC server module to request the at least one electrical device which includes a circuit breaker to trip in response to a fault.

14. The communication system according to claim 1, wherein the at least one electrical device includes at least one of a busbar, a transformer, a circuit breaker, a switch, a feeder line or a load.

* * * * *